UNITED STATES PATENT OFFICE.

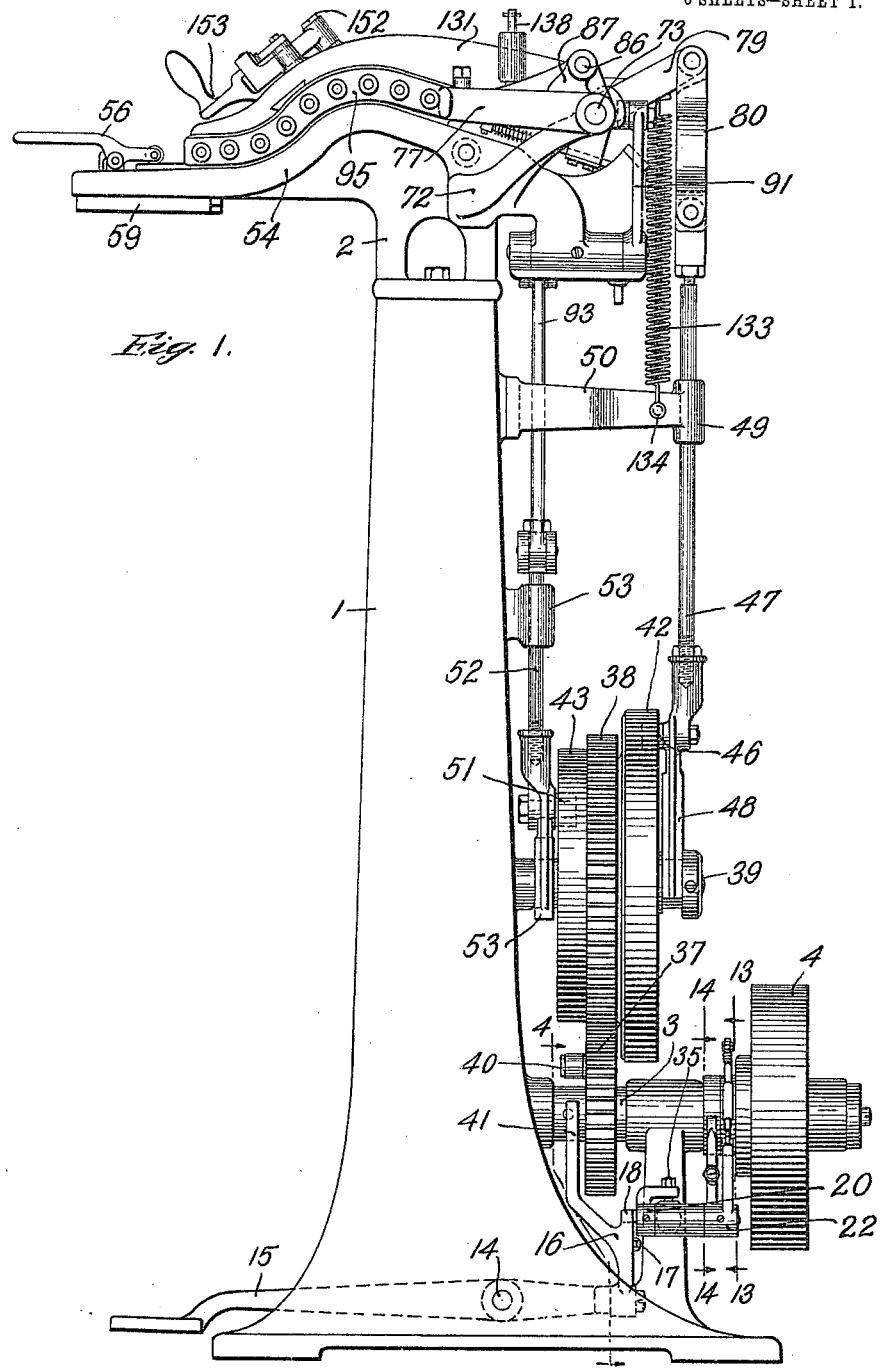

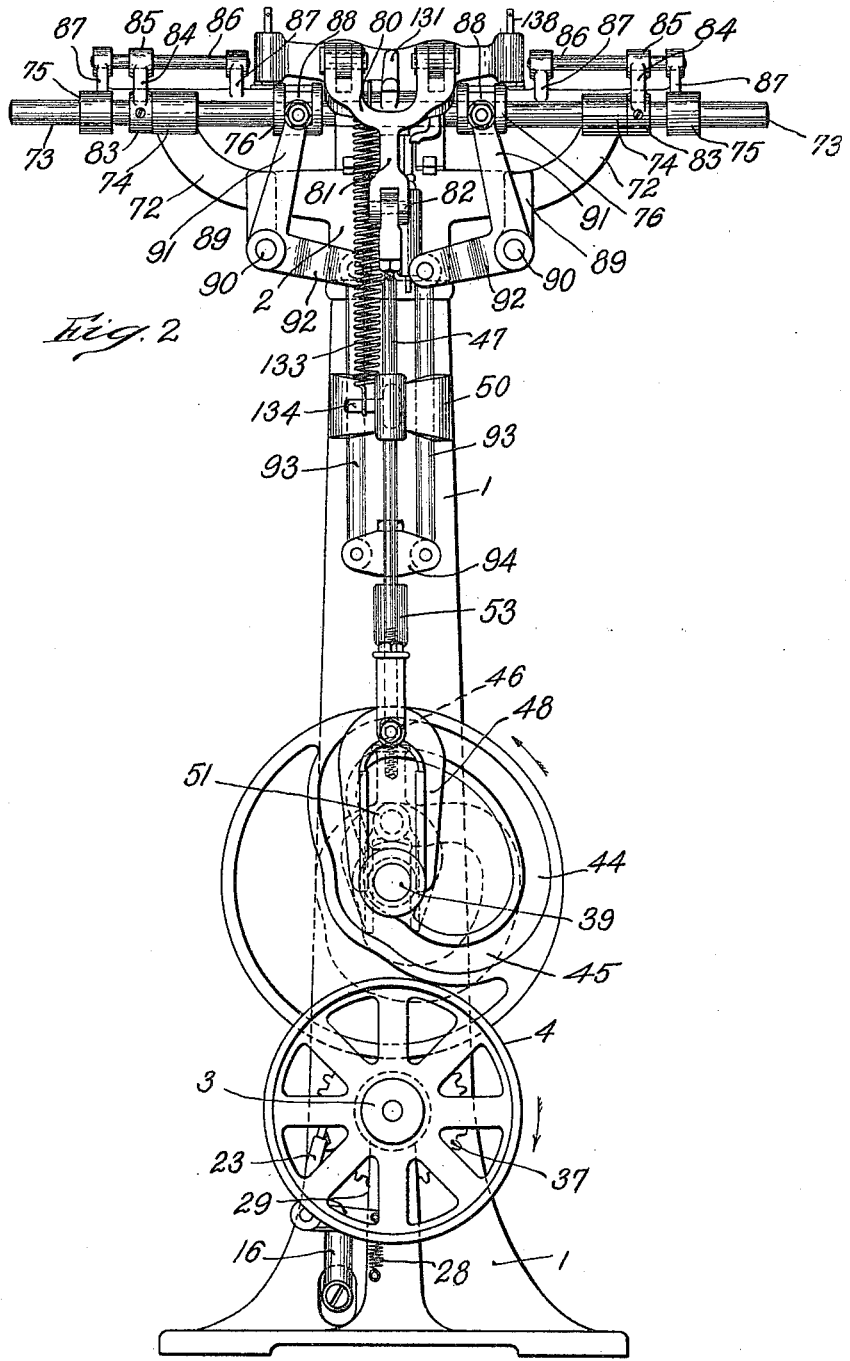

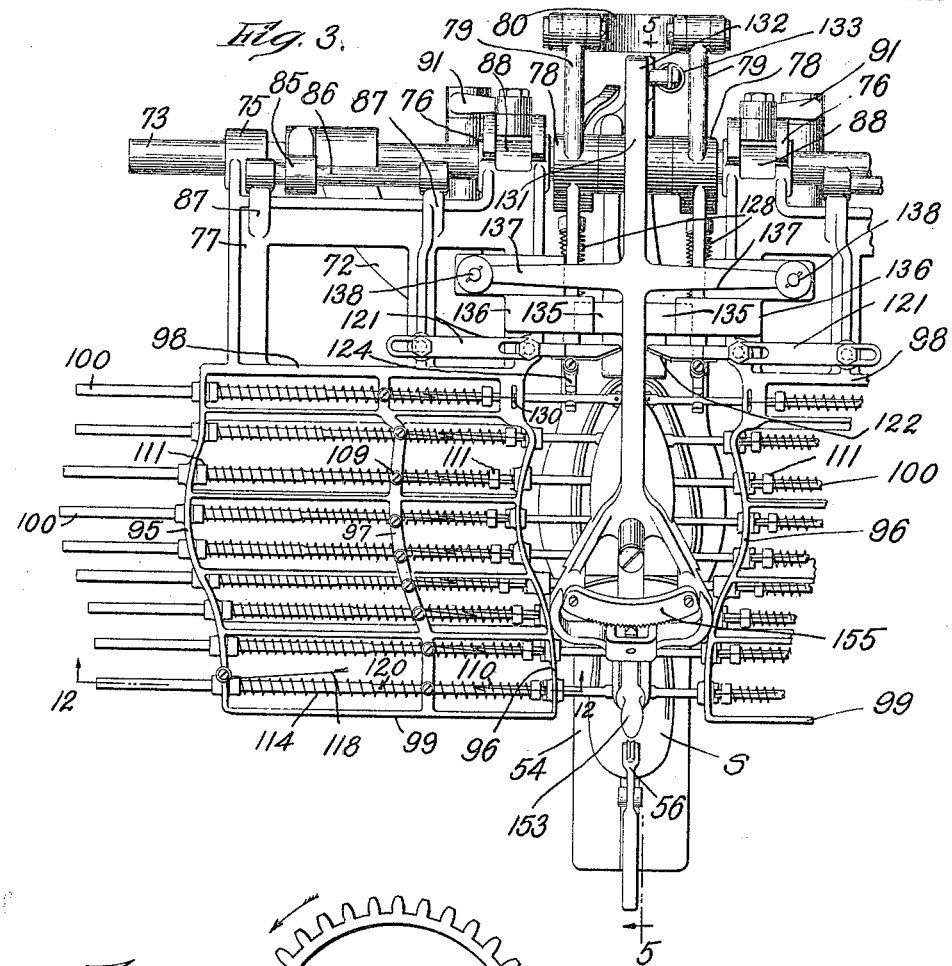
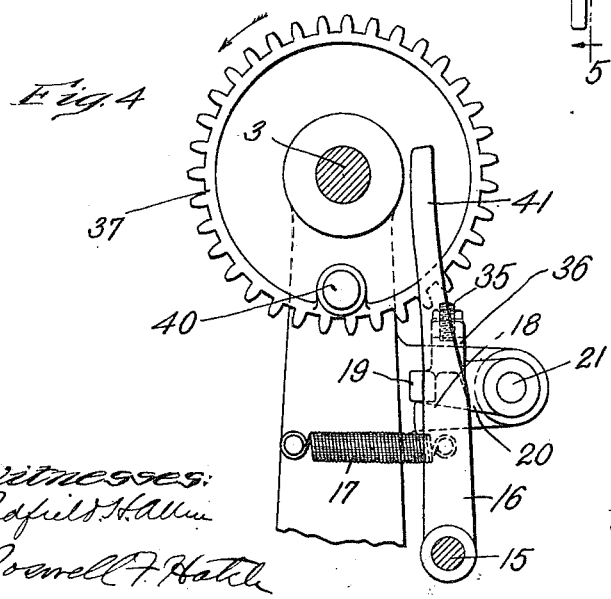

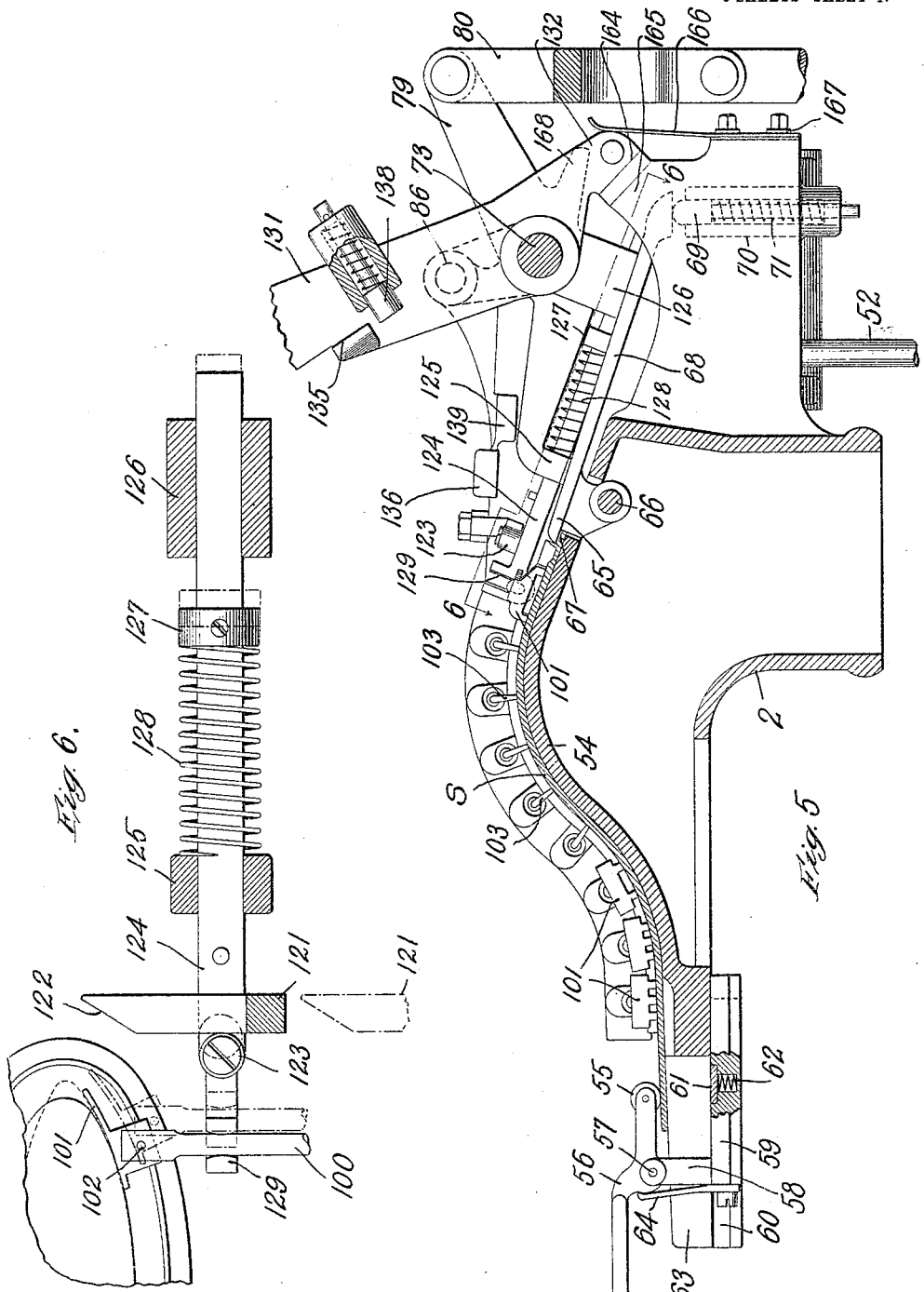

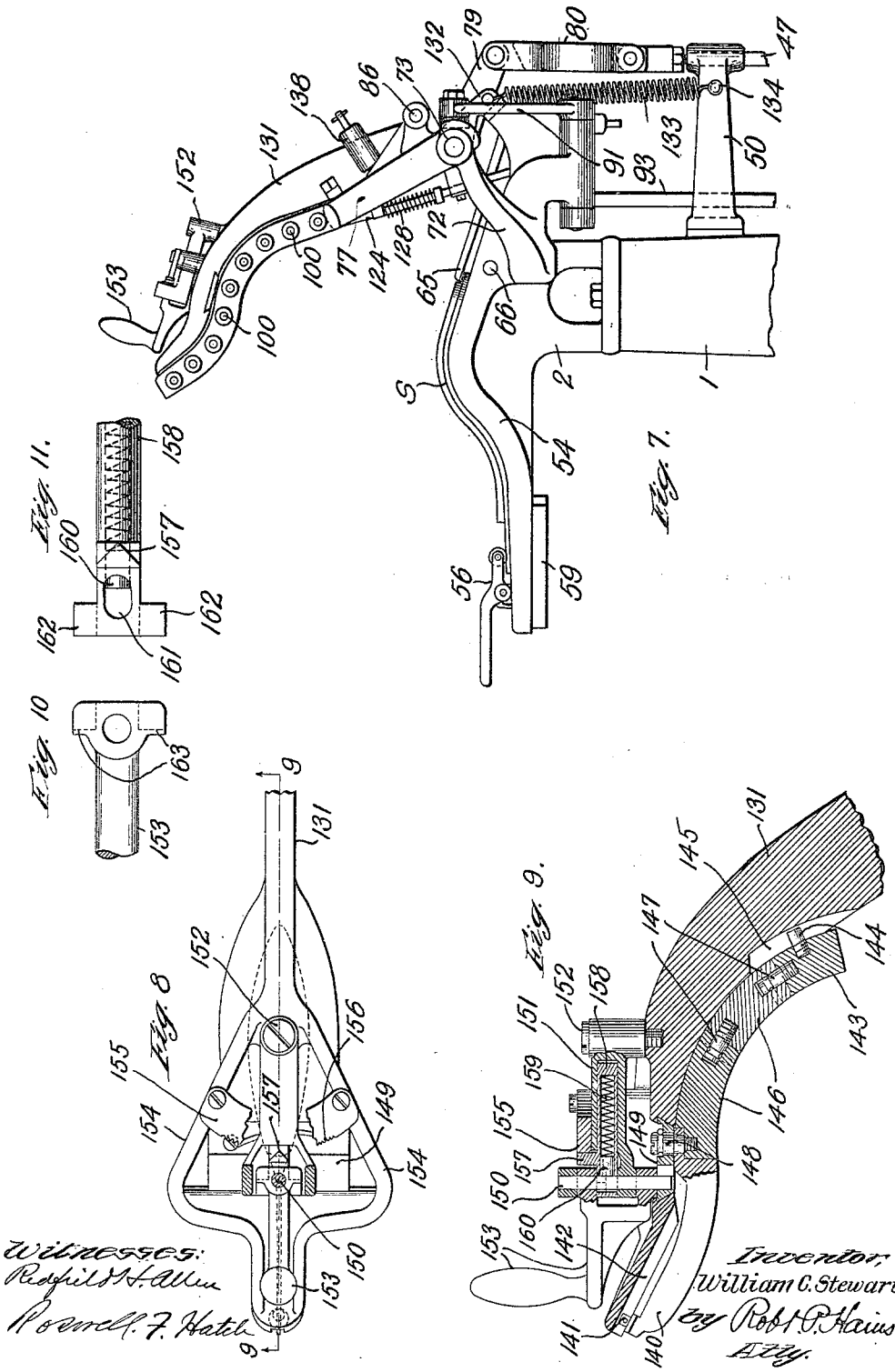

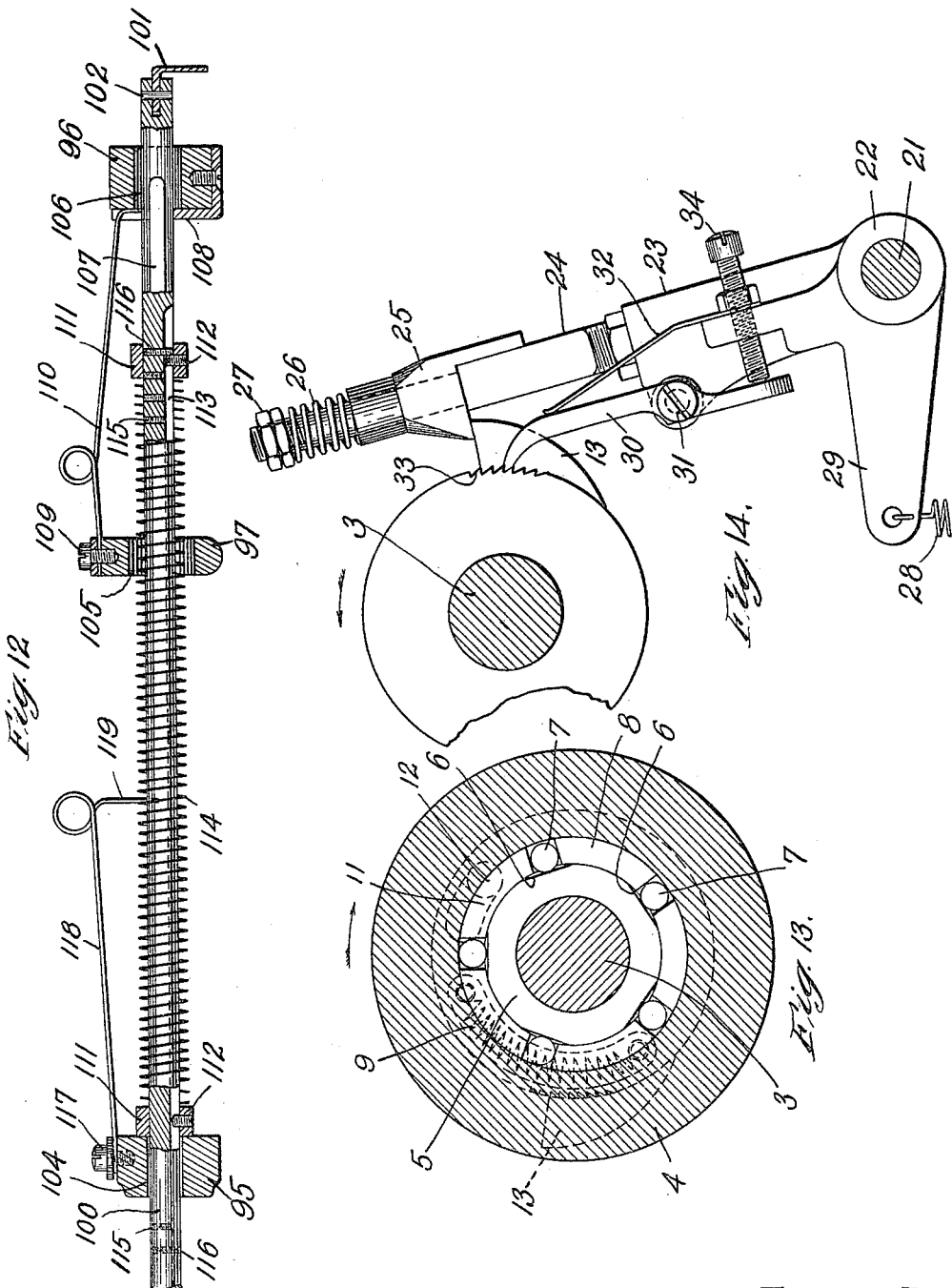

WILLIAM C. STEWART, OF LYNN, MASSACHUSETTS, ASSIGNOR TO THOMAS G. PLANT, OF BOSTON, MASSACHUSETTS.

INSOLE COVERING AND REINFORCING MACHINE.

965,342. Specification of Letters Patent. Patented July 26, 1910.

Application filed January 25, 1909. Serial No. 473,955.

*To all whom it may concern:*

Be it known that I, WILLIAM C. STEWART, a subject of the King of Great Britain, residing at Lynn, in the county of Essex and State of Massachusetts, have invented an Improvement in Insole Covering and Reinforcing Machines, of which the following description, in connection with the accompanying drawings, is a specification, like letters on the drawings representing like parts.

The invention to be hereinafter described relates to machines for treating insoles, and more particularly for reinforcing or covering insoles with a fabric and is a development of the machine shown, described, and claimed in Patent No. 883,837 granted to me April 7, 1908, to which reference may be had.
The aims and objects of the present invention are to provide a machine of the general character stated which will be simple in construction and efficient in operation, the various characteristics contributing to these ends being best understood from the following specification and drawings of one form of means embodying the invention, which, in its true scope, is definitely set forth by the claims.
In the drawings: Figure 1 is a side elevation of a machine comprising the invention; Fig. 2 is a rear elevation of the same; Fig. 3 is a plan view with one side portion of the protector frame broken away; Fig. 4 is a sectional detail on the line 4—4, Fig. 1; Fig. 5 is an enlarged sectional view on line 5—5, Fig. 3, with the presser or centering frame raised and partly broken away; Fig. 6 is a detail sectional view on line 6—6, Fig. 5;
Fig. 7 is a side elevation of the upper portion of the machine showing the protector frame and presser or centering frame in raised position; Fig. 8 is a plan view of the outer end of the presser or centering frame, showing the means for moving its flexible face or centering portion; Fig. 9 is a section on line 9—9, Fig. 8; Figs. 10 and 11 are detached details showing the handle operated lock and trip for the flexible face of the presser or centering means; Fig. 12 is an enlarged detached sectional detail of a protector carrier at the outer portion of the protector frame, on line 12—12, Fig. 3; Fig. 13 is a section on line 13—13, Fig. 1; and Fig. 14 is a section on line 14—14, Fig. 1.

In the manufacture of insoles of the general character herein referred to, the leather is died out or rounded to shape and channeled, the lip being upturned. Before the fabric is applied, the face thereof has been suitably treated with a cement, and the fabric thus treated then placed upon the insole and roughly forced to position. The usual practice in making such insoles has been to lay the sole upon a flat table and roughly position the fabric thereon by hand, leaving the cemented face of the marginal portion of the fabric resting against the edge of the upturned channel lip, or in loose contact with a portion of the surface of said lip. This results in an adhesion of one to the other with consequent defects and objections, as pointed out in Patent No. 883,837.

With the above matters in view the characteristics of the present invention will be readily understood from the following illustrated and described embodiment thereof.

Referring to Fig. 1, 1 is a standard car-
rying at its upper portion the machine head,
which may be generally designated 2. Mounted in the lower part of the standard 1 is the driving shaft 3, Figs. 1 and 2, which may be driven from any suitable source of power through a belt pulley 4, a suitable clutch mechanism being preferably provided for operatively connecting the shaft 3 to the pulley 4, as desired. In the present form of the invention the clutch for connecting the driving pulley and shaft may be of the "Horton" type and comprise a sleeve member 5 fast to the shaft, and having cam portions 6, Fig. 13, between which and the hub of the pulley 4 are interposed suitable rolls 7. These rolls, as usual, are carried by a cage 8 loosely mounted on the sleeve 5, a spring 9 normally acting upon the cage 8 to turn it with relation to the sleeve 5 a distance determined by the slot and pin 11 and 12, to cause the rolls 7 to operatively connect the hub of the driving pulley 4 with the sleeve 5 fixed to the driving shaft. The member or cage 8 is provided with a stop 13 which, when restrained from movement responsive to the spring 9, will cause the clutch members to be disengaged, the construction in this respect being as usual in this class of clutches.

Pivoted on the column 1 at 14 is a treadle 15, the rear end of which has an upwardly projecting arm 16 capable of a short rotative movement on the treadle 15, as will be apparent from Fig. 1. A spring 17, Figs. 1 and 4, serves to normally hold the arm 16 in the position indicated in Figs. 1 and 4, with the stop 18, dotted lines Fig. 4, engaging a projection 19 carried by an arm 20 on the short shaft 21 to which it is secured. On the opposite end of the shaft 21 is fixed a hub 22, carrying an arm 23 into which is screw-threaded an arm 24 on the upper portion of which is carried the stop 25, said stop being yieldingly maintained on the arm 24 by means of a spring 26 and suitable adjusting nuts 27, Fig. 14.

From the construction thus far described, it will be apparent that upon depression of the treadle the arm 16, by means of its stop 18 acting upon the projection 19, will turn the shaft 21 clockwise and correspondingly turn the arm 23 and its stop 25 from engagement with the projection or stop 13 of the clutch, thereby freeing the cage 8 to the action of the spring 9 and permitting the clutch members to become operatively engaged. To return the arm 23 to its position, Fig. 14, a spring 28 connected to an arm 29 may be employed, so that upon releasing the treadle 15 the stop 25 will move to the left, Fig. 14, into position to engage the projection or stop 13 as the clutch member rotates in the direction of the arrow with the shaft 3. When the stop 25 is engaged by the projection 13 of the clutch member, it is apparent that this member will at once be stopped, but that the momentum of the machine parts will carry the shaft some distance farther, thereby extending the spring 9 and causing the rollers 7 to be fully disengaged from their clutching connection with the hub of the driving wheel, and to maintain the parts in this relation a pawl 30 is pivoted at 31 to the arm 23, Fig. 14, said pawl being normally pressed, as indicated, by the spring 32 to cause its end to engage with a series of teeth 33 on the clutch member fast to the shaft 3. An adjusting screw 34 determines the limit of movement of the pawl 30. While I have deemed the present form of clutch connection between the shaft 3 of the driving pulley a preferable one, it is apparent that any usual form of clutch connection which may be treadle controlled may be used.

Connected to the arm 20 carrying the stop 19, Fig. 4, is an adjusting screw 35, the active or lower end of which is positioned, Fig. 1, to engage with a shoulder 36 on a bracket projecting from the machine frame to limit the downward movement of the arm 20 when the shoulder or stop 18 of the treadle arm 16 is thrown from under the stop 19, as will presently appear.

Mounted on the driving shaft 3 is a pinion 37 which meshes with a pinion 38 loosely mounted on a countershaft 39, the relation of the pinions being preferably as two to one, that is, they are so related that one rotation of the pinion 37 will cause a half rotation of the pinion 38.

For reasons which will hereinafter appear, it is desirable that the driving shaft, to which the pinion 37 is secured, may be unclutched from the driving pulley 4 when said shaft has made one complete rotation, and to this end the pinion 37 carries a stop or pin 40, Figs. 1 and 4, and the arm 16 carried by the treadle 15 has an upwardly projecting arm 41, which, as the pinion 37 rotates, is engaged by the pin 40 and forced to the right, Fig. 4, thereby carrying the shoulder 18 of the arm 16 from under the stop 19, thereby allowing the arm 23 carrying the stop 25, Fig. 14, to be moved into position to engage the projection 13 of the clutch member, the construction being such that regardless of whether the operative removes his foot from the treadle 15 or not, the driving shaft 3 will be unclutched from driving connection with the pulley 4 when said shaft has made one complete rotation.

Rotatably connected to the pinion 38 and the countershaft 39 are the two cam members 42 and 43 having the cam paths 44 and 45, respectively, formed on the faces thereof. The cam 44 is engaged by a roll 46 carried by a rod 47, the lower portion 48 of which is preferably bifurcated, as indicated in Figs. 1 and 2, to engage or straddle the shaft 39 and thereby act as a guide for the upward and downward movement of the rod 47, said guiding action of said rod being further secured by means of a bearing 49, Fig. 1, carried by an arm 50 projecting from the column 1. Similarly the cam path 45 of the cam 43 is engaged by a roll 51 carried by a rod 52, the lower end of which is bifurcated at 53 to engage the countershaft 39 and thereby act as a guide for the upward and downward movement of the rod 52, said rod being further guided in such movement by a bearing 53 projecting from the column 1, Fig. 1.

From the construction thus far described, it will be noted that upon depression of the treadle 15 the driving shaft 3 will be clutched to the driving pulley 4, and, if the operative removes his foot from the treadle, the catch or stop 25 on the arm 23 will be in position to engage the projection 13 on the clutch member, but if the operative should fail to take his foot from the treadle, then the pin 40 on the pinion 37, acting upon the arm 41, would cause a like positioning of the stop 25 and consequent stopping of the machine upon one complete rotation of the driving shaft, causing the pinion 38 and its cams 42 and 43 to be given one-half rotation.

In order that the sole to be reinforced or covered by the mechanism presently to be described may be sustained, the head portion 2 is provided with a work support or sole rest 54 preferably curved, as indicated, and in order that the sole S to be treated may be properly held upon this support, holding means are provided, one for each end of the sole.

The holding means for the heel end of the sole consists of a sharp edged roll or wheel 55, Fig. 5, carried by a lever arm 56, pivoted at 57 to a standard 58 rising from a slide 59 which is movable in ways 60 on the machine head, said slide 59 being held from movement responsive to light force or jarring of the machine by means of a friction piece 61 carried by the slide, and normally pressed against the under portion of the ways 60 by a spring 62, Fig. 5. At its outer end the support 54 is slotted, as at 63, and upwardly through this slot projects the standard 58, said slot permitting the standard and consequently the holder 55 to be adjusted for different lengths of insoles. The holder 55 is held in clamping position upon the heel of the insole S by means of a spring 64 acting against the lever 56.

The holder 65 for the toe end of the insole, Fig. 5, is preferably pivoted at 66 to the machine head, and has on its under face a knife edge 67 attached to engage the edge of the sole outside of the channel lip, as indicated in Fig. 5. The holder 65 has a shank portion 68 extending rearward and resting upon a plunger 69 movable in a suitable socket piece 70 and normally forced upward or into sole clamping position by means of a spring 71 surrounding the stem of said plunger 69.

It will thus be seen that the heel and toe holders serve to securely clamp the sole S upon the work support for the action of the machine, as will now be described. Sustained by suitable arms 72, 72, projecting upwardly from the head 2 on the column 1 is a cross rod or shaft 73 passing through the bearings 74 carried by said arms 72. Loosely mounted on the shaft 73 so as to turn and slide longitudinally thereon are the bearing portions 75 and 76 of the frame 77, which frame, for identification, may hereinafter be designated the protector frame.

Fast to the rod or shaft 73 are the hubs 78 carrying arms 79 connected at their outer ends to the yoke 80, Figs. 2 and 3, said yoke having a depending portion 81 jointed at 82 to the rod 47, which, as hereinbefore explained, has a roll 46 engaged with the cam path of the cam wheel 42. It will thus be noted that, as the cam wheel 42 rotates, it will rotate the rod or shaft 73, but since the protector frame 77 is loosely mounted on this rod or shaft 73, it will not partake of its turning movement except through the means now to be described.

Secured to the rod or shaft 73 are the collars 83, 83, having upwardly projecting arms 84 carrying the sleeves 85 which engage the rods 86 carried by upwardly projecting lugs 87 on the protector frame 77, said sleeves 85 loosely fitting said rods 86, so that said rods 86 may slide freely through said sleeves. From this construction it will be seen that as the rod or shaft 73 is turned in the manner hereinbefore stated, the collars 83 and their sleeves 85 which engage the rods 86 will turn with the shaft and consequently raise or lower the protector frames 77, while permitting said frames to be moved toward and from each other, it being understood that there are two of such frames, one on each side of the center of the machine. In order that these two frames 77 may be moved toward and from each other at desired times, as will hereinafter more fully appear, the bearing portions 76, which embrace the rod or shaft 73, are provided with circumferential grooves 88, Figs. 2 and 3. Mounted in suitable brackets 89 depending from the arms 72 and secured to the head 2 of the machine are bell crank levers pivoted at 90, the upper arms 91 of said levers carrying rolls which engage the circumferential grooves 88, the other arms 92 of the bell cranks being connected to their operating rods 93, Figs. 1 and 2, which rods are themselves jointed at 94 to the rod 52, the roll 51 of which engages a cam path of the cam 43.

From the construction described it will be seen that upon rotation of the countershaft 39 the protector frames 77 may be raised and lowered with respect to the work support 54, and may also be moved toward and from each other, such movements being dependent upon the characteristics of the operating cams 42 and 43.

As hereinbefore noted there are two protector frames 77, one on each side of the machine center, and as these protector frames are alike, a description of one will be sufficient.

The protector frame 77 may be and preferably is of the open and light character as indicated in Fig. 3, and comprising the side pieces 95 and 96 and center piece 97, which side and center pieces connect the two end portions 98 and 99, see Fig. 3.

Mounted in the protector frame are a series of protector arms 100, nine of said arms being indicated in the illustrated form of the invention, but obviously a different number, more or less, may be employed if desired. These protector arms 100 preferably consist of rods, as indicated in Fig. 12, some of which, see Fig. 5, carry protector plates 101 preferably hinged at 102 to the ends thereof, so as to be capable of swinging in a direction parallel to the plane of the sole which they are intended to engage. These protector plates or lip protectors, as they may be conveniently designated, are intended to engage the inner surface of the upturned channel lip and to protect it from contact with the reinforcing fabric when the same is being applied to the sole, as will hereinafter more fully appear. Others of said protector arms 100 are provided with pointed fingers 103, Fig. 5, which, like the protector plates or lip protectors, engage the inner upturned surface of the channel lip to guard it against contact with the cemented surface of the reinforcing fabric as the latter is being applied.

The side and center pieces 95, 96 and 97 of the protector frame are provided with openings for the free passage of the protector arms 100, see Fig. 12. A passageway 104 in the side arm 95 may fit the protector arms with more accuracy and closeness than the openings 105 and 106 in the center and side arms of the frame, said last named openings being of larger extent to permit movement of the protector arms in a direction transversely to the protector frame. This characteristic movement permits a yielding action of the protector arms and adapts them for the treatment of soles of different thickness, as will later appear.

In order that the protector arms may not turn axially in the protector frame, said arms are preferably provided with a flattened side portion 107, Fig. 12, which engages vertical slots in the metal piece 108 secured to the side arm 96 of the protector frame, so that while the protector arms may move bodily toward and from the upper surface of the protector frame, they will be restrained from axial movement.

In order that the protector rods at their inner ends may be normally in depressed position with respect to the protector frames, the center piece 97 of the frame has secured thereto by screws 109 a series of spring fingers 110, the ends of which engage the top of the protector arms and hold them depressed, as will be readily understood by those skilled in the art, Fig. 12.

Loosely mounted on each of the protector arms are the collars 111, 111, each of which has a pin 112 which engages a groove 113 extending longitudinally of the protector arm. Disposed about each protector rod and between the collars 111 is the spring 114 normally acting to separate the collars. Each of the protector arms 100 is provided with a series of screw-threaded perforations 115, any one of which is adapted to be engaged by a screw-threaded stop 116 to thereby limit the expanding tendency of the spring 114 and the separation of the collars 111. From this construction it will be noted that provision is made for adjustment of the spring action so that it can be made greater or less according to the width or style of the sole to be treated.

In the treatment of some soles it is desirable that the end protector, that is, the one acting near the heel portion of the sole, shall be maintained out of action and to accomplish this the outer side bearing 95 of the protector frame, Fig. 12, has secured to it by a screw 117 a spring 118, the end 119 of which is adapted to engage a suitable opening 120, Fig. 3, in the end protector arm 100.

As will appear more fully hereinafter, the protector frames are lowered upon the sole sustained upon the work support, when said frames are contracted or closed toward each other, and that, after engagement of the protector plates and fingers with the insole, the said protector frames are separated. In the treatment of some forms of soles, especially where the toe end is much pointed, it is desirable that provision be made to insure the proper engagement of the protector plates near the toe with the sole inside of the channel lip, and to this end the protector arms and their attached plates for treating the toe portion of the sole are so held that, as the protector frames descend upon the work, they will be sure to engage the sole some distance back of the toe and inside of the channel lip, and, as the frames are expanded, they will move into contact with the channel lip at the toe. One means of securing this end is indicated in Figs. 3 and 6, wherein the protector frame has adjustably mounted thereon a cam carrying piece 121 having an inclined or cam end 122 adapted to engage a roll 123, or it may be a pin, carried by a toe protector controller 124, suitably mounted in bearings 125 and 126 on the protector frame and having an adjustable collar 127 between which and the bearing 125 is disposed a spring 128 normally acting to move the controller 124 to the right, Fig. 6. The forward or left hand end of the controller, Fig. 6, is provided with an engaging portion 129, adapted to engage an extended portion of the toe protector arm 100. The toe protector arm 100, Fig. 3, is mounted in an elongated slot in the side arm 96 of the protector frame, so that the plate carrying end of said arm may have movement in a direction substantially lengthwise of the sole or protector frame to the extent of the slot 130, such movement being indicated by dotted lines in Fig. 6. When the protector frames 77 are in their contracted or closed position, the cam carrying pieces 121 engage the rolls 123 of the controllers 124, thereby moving the toe protector arms 100 lengthwise of the sole away from the toe, but when said protector frames 77 are separated, the cam carrying pieces 121 will be moved from engagement with the rolls 123 on the controllers 124, whereupon the springs 128 will assert themselves and move the toe ends of the protector arms toward the toe of the sole, and cause the plates 101 on the ends of said protector arms to engage the upturned face of the channel lip, it being understood that the protector plates 101 on the toe protector arms are hinged at 102 as are the protector plates 101 on the other protector arms.

Mounted to turn loosely upon the shaft or rod 73, Figs. 1, 3, 5 and 7, is the centering frame or presser 131, said centering frame or presser having a rearwardly extending arm 132 to which is connected one end of a spring 133, the other end of said spring being connected at 134 to a pin sustained by the bracket 50 projecting from the column of the machine, the construction being such that the normal tendency of the spring 133 is to raise the centering frame or presser 131, as will be obvious, see Figs. 1, 3 and 7.

Extending to each side of the center of the said frame or presser 131 is an arm 135, the top surface of which, when the protector frames 77 are raised and contracted or brought together, is adapted to engage the under surface of a corresponding projecting arm 136 on each of the protector frames, Figs. 3 and 5, whereby when the protector frames are in raised and contracted position, their arms 136 overlie the arms 135, and on depression of the protector frames by the means hereinbefore described, the centering frame or presser is likewise brought down toward the work support 54.

The centering frame or presser 131 is also provided with the arms 137, Figs. 3 and 5, each carrying a spring-pressed plunger 138 adapted to engage suitable projections 139 on the protector frames, when said protector frames and centering frame or presser are brought together, the construction being such that if the protector frames are raised from their sole engaging position, the projections 139 thereof will contact with the spring plungers 138 and cushion the return movement.

Mounted on the face of the centering frame or presser 131 is a flexible face portion adapted to be moved transversely to adjust said face portion toward one or the other side of said frame for the treatment of rights and lefts. This flexible face portion preferably comprises an end piece 140, Fig. 9, pivotally engaged at 141 with a slot 142 carried by the frame, and an end piece or block 143 having a pin 144 engaging a slot 145 in said frame, between said piece 140 and block 143 there being interposed a series of flexible portions 146 connected by suitable pins 147. The piece 140 and the end of the flexible portion 146 are connected by a pin 148 to a slide 149, said slide being engaged by a pin 150 mounted on the arm 151 swinging about the fulcrum or pivot pin 152, Figs. 8 and 9, a suitable handle 153 being provided and mounted on the pin 150, as will be evident from Figs. 8 and 9.

Secured to arms 154 carried by the centering frame or presser 131 is a rack 155 having rack teeth 156 adapted to be engaged by a holding tooth 157, Figs. 8 and 11, said holding tooth being carried by a hollow sleeve 158 in which is seated a spring 159, the opposite end of said spring engaging an abutment or stop 160 which may appropriately rest against the pin 150.

The sleeve 158 carrying the holding tooth 157 has an elongated slot 161, Fig. 11, through which passes the pin 150, and it is likewise provided with side projecting wings or portions 162 adapted to be engaged by side projecting portions 163 of the handle 153, the construction being such that upon moving the handle 153 to the right or left, it will first move the sleeve 158 and its tooth 157 so as to disengage the latter from the rack 155 and further movement of the handle will then carry the slide 149 to the right or left, and thereby adjust the facing portion of the centering frame or presser 131.

The facing portion of the centering frame or presser 131 is met by the ends of the protector arms 100 when the protector frames are in contracted position, so that by adjusting the flexible face portion of the centering frame or presser 131 for rights or lefts or different styles of soles, the lip engaging ends of the protector arms will be likewise positioned.

In order to limit the upward swing of the centering frame or presser 131 as it rises under the impulse of its actuating spring 133, said frame 131 has a stop 164, Figs. 5 and 7, adapted to engage a similar stop 165 on the machine head, and a spring 166 secured to the head at 167 and bearing upon the projection 132 of the centering frame or presser serves to maintain said frame in steady position and substantially free from vibration when it is raised and the machine is being operated.

It is desirable, when the operation of placing the reinforcing or covering material upon the insole has been completed and the protector frames are raised, to free the sole S from its toe holder 65, and to this end the protector frame has a projection 168, Fig. 5, adapted, when the protector frames are raised, to contact with the projecting end 68 of the holder above the spring-pressed plunger 69, and to depress said end against the force of the plunger, thereby raising the sole holding end from holding contact with the sole.

Assuming the parts to be in a position of rest with the protector frame and centering frame or presser swung upward from the work support, and the centering frames contracted toward each other, as hereinbefore pointed out, and further with the projections 136 of the protector frames overlying the parts 135 of the centering frame or presser, the operation of the machine may be briefly stated as follows.

The sole S to be treated is first placed upon the work support 54, its toe end being placed beneath the knife edged portion of the holder 65 and its heel portion placed beneath the heel holder 55. The operator then depresses the treadle, thereby permitting the clutch to engage the driving shaft 3 with the pulley 4 and start the machine. The protector frames and the centering frame or presser are then lowered upon the sole on the work support by the cam 42 acting through the rod 47 and its connections with the protector frames. When the protector frames and centering frame or presser are thus brought down upon the work by power, the protector arms bear against the face portion of the centering frame or presser, said face portion having been previously adjusted as desired for rights and lefts or styles. The lip protecting plates or fingers and the ends of the protector arms will thus engage the sole in proper position well inside the channel lip. As the countershaft 39 continues to rotate, the cam member 43, acting through the rod 52 and its connections with the bell cranks pivoted at 90, will cause a separation of the protector frames until the protector plates or fingers bring up against the inner surface of the upturned lip, the springs on the protector arms then yielding to permit the parts to remain thus engaged. As the protector frames separate, they carry the projections 136 from over the co-acting portions 135 of the centering frame or presser, and said centering frame or presser then rises in response to its actuating spring 133. Also, as the protector frames separate, the cam pieces 121 free the controllers 124 and permit the springs 128 to move the toe portions of the toe protector arms forward or into contact with the channel lip at the toe. If the operator has taken his foot from the treadle the machine will stop, as hereinbefore pointed out, on one complete rotation of the driving shaft; but if he has failed to take his foot from the treadle the pin 40 will contact with the arm 41 carried by the treadle and trip the arm 23 so that its catch will engage with the projection 13 of the clutch member and cause the driving shaft to come to rest. The operator now takes a piece of canvas or other fabric and applies it to the sole within the channel lip, the protector plates and fingers shielding the surface of the lip from contact with the cemented surface of the fabric. The operator may then run a tool around over the top of the canvas and roughly force it into the channel. If desired, he may likewise bring down the centering frame or presser by hand and by means of the handle 153 move the flexible face of said frame over the body of the canvas upon the sole and then permit the centering frame or presser to return to its raised position. Having secured the canvas to the sole substantially in the manner stated, or otherwise, the operator now again depresses the treadle, thereby starting the machine, which, on rotation of the driving shaft 3, completes the rotation of the countershaft and causes the protector frames to be raised and then contracted or moved toward each other into original position, the machine stopping either by the operator removing his foot from the treadle, or automatically, on completing another rotation of the driving shaft.

It will be obvious to those skilled in the art that various changes may be made in the details of the means herein shown and described for carrying the invention into practical effect, and it is to be understood that applicant does not regard himself as restricted to these details, his invention in its true scope being definitely set forth by the claims.

What is claimed is:

1. In a machine for protecting the channel lip of an insole during the application of a reinforcing fabric, the combination of a work support for sustaining a shoe sole, channel lip protecting means to shield the lip as the reinforcing fabric is applied to the sole, and power operated means for causing relative approach and positive separation of the work support and lip protecting means.

2. In a machine of the character described, the combination of a work support for sustaining a shoe sole, lip protecting means to shield the lip as the reinforcing material is being applied to the sole, a power driving shaft and connections between the power driving shaft and lip protecting means to positively move the latter toward and from the work support.

3. In a machine for protecting the channel lip of an insole during the application of a reinforcing material, the combination of a work support for sustaining an insole, lip protecting means to shield the channel lip as the reinforcing material is being applied to the sole, a driving shaft, and means driven from said shaft for positively moving the lip protecting means transversely toward and from the edge of the sole.

4. In a machine for applying a fabric to a shoe sole, the combination of a work support, channel lip protectors to shield the lip, a power shaft, connections between the power shaft and lip protectors to positively move the protectors toward the work support and to then positively separate the protectors widthwise of the sole.

5. In a machine of the character described, the combination of a work support, channel lip protectors to shield the lip, a power shaft, and means for causing said power shaft to relatively move the lip protectors and work support into co-acting relation and the protectors into engagement with the channel lip and devices acting to then stop the said means.

6. In a machine of the character described, the combination of a work support, channel lip protectors to shield the lip, power actuated means for moving the lip protectors toward the sole on the work support and holding the parts in such relation, and power actuated means for moving the lip protectors transversely of the sole.

7. In a machine of the character described, the combination of a work support, lip protectors to shield the lip of a shoe sole on said support from contact with the reinforcing fabric as it is being applied, cam actuated means for relatively moving the support and protectors to bring the protectors into co-acting relation with the sole, and cam actuated means for moving the protectors transversely of the sole.

8. In a machine of the character described, the combination of a work support for sustaining a shoe sole, lip protectors for shielding the channel lip of a sole from contact with the reinforcing material as it is applied, a driving shaft, a clutch for connecting and disconnecting said shaft with and from its actuating means, and connections between said shaft and lip protectors for moving the latter from the former and holding the protectors in operative position.

9. In a machine of the character described, the combination of a work support for sustaining a shoe sole, protector frames carrying lip protectors, a driving shaft, clutch mechanism for connecting said shaft with its actuating means, and connections between the said shaft and protector frames for positively moving the latter from the former toward and from the work support.

10. In a machine of the character described, the combination of a work support for sustaining a shoe sole, protector frames carrying lip protectors, a driving shaft, clutch mechanism for connecting said shaft with its actuating means, connections between said shaft and protector frames for moving the latter toward the work support and for separating said protector frames, and means for then operating the clutch automatically to stop the driving shaft.

11. In a machine of the character described, the combination of a work support, lip protecting means to shield the lip as reinforcing material is applied to the sole, and means engaging the shoe sole outside the channel lip to hold both ends of the sole on the work support.

12. In a machine of the character described, the combination of a work support, lip protecting means to shield the lip as reinforcing material is applied to the sole, and means engaging the shoe sole outside the channel lip to hold both ends of the sole on the work support, one of said holding means having a knife edge.

13. In a machine of the character described, the combination of a work support, lip protecting means to shield the lip of a shoe sole on said support as a reinforcing fabric is applied to the sole, a toe clamp for engaging the sole outside the channel lip, and a work clamp or holder to engage the heel portion of the sole, a slide for said heel clamp or holder, and a support projecting through the work support and sustaining said clamp or holder.

14. In a machine of the character described, the combination of a work support, lip protecting means to shield the lip of a shoe sole on said support as a reinforcing fabric is applied to the sole, a toe clamp for engaging the sole outside the channel lip, and a spring actuated work clamp or holder, a slide for said heel clamp or holder to engage the heel portion of the sole, and a support projecting through the work support and sustaining said clamp or holder.

15. In a machine of the character described, the combination of a work support, a protector frame, a plurality of lip protectors carried by said frame, and means to permit said lip protectors to yield with relation to said frame in a direction toward and from the work support.

16. In a machine of the character described, the combination of a work support, a protector frame, and a plurality of lip protectors carried by said frame, the lip engaging portions of said lip protectors being movable transversely to the general plane of said protector frame.

17. In a machine of the character described, the combination of a work support, a protector frame, a plurality of protector arms carried by said frame, lip protecting means sustained by said arms, and means to permit said arms to yield in a direction transverse to the plane of the frame.

18. A protector frame having side supports, and protector arms mounted in said supports and carrying lip protectors, said arms being movable in said supports in a direction transverse to the plane of the protector frame.

19. A protector frame having side supports, protector arms mounted in said supports and carrying lip protectors, said arms being movable in said supports in a direction transverse to the length of said arms, and means to yieldingly restrain the arms from said movement.

20. A protector frame having side supports, protector arms mounted in said supports and carrying lip protectors, and means to prevent rotative movement of the arms, said arms being movable in said supports in a direction transverse to the plane of the protector frame.

21. A protector frame having side supports provided with enlarged bearing portions, protector arms carrying lip protectors, said arms being movable in said enlarged bearing portions of said supports in a direction transverse to the length of said arms, and means to yieldingly restrain the arms from said movement.

22. In a machine of the character described, a protector frame, protector arms having lip protectors and carried by said frame, loose collars on said arms, a spring disposed between said collars, and adjustable stops for said collars.

23. In a machine of the character described, a protector frame, protector arms carried by said frame and longitudinally movable with respect thereto, a single spring on each of said arms, and means for adjusting the effective tension of said spring.

24. In a machine of the character described, the combination of a protector frame, a toe lip protector carried by said frame, a controller normally acting to move the toe lip protector lengthwise of the protector frame, and means to restrain such action of the controller until the toe lip protector has engaged the sole within the channel lip.

25. In a machine of the character described, the combination of a work support, a protector frame movable transversely thereof, a toe lip protector carried by and movable in a direction lengthwise the said frame, a controller normally acting to move the toe lip controller lengthwise of the protector frame, and means operative when the protector frame is moved transversely in one direction to restrain such movement of the toe lip protector and when moved in the opposite direction to free the said protector to movement responsive to the controller.

26. In a machine of the character described, the combination of a protector frame, a toe lip protector mounted in said frame, and means to move said toe lip protector in a direction longitudinally of said frame.

27. In a machine of the character described, the combination of a work support, a toe lip protector, means for moving the toe lip protector in a direction transversely of the work support, and means to move the toe lip protector in a direction longitudinally of said work support.

28. In a machine of the character described, the combination of a work support, a protector frame, lip protectors carried by said frame, and a spring arm secured to the frame to hold a lip protector in inoperative position in said frame.

29. In a machine of the character described, the combination of a work support, means for protecting the channel lip of a sole on said support from contact with the covering or reinforcing material, centering means for the lip protecting means to position the same inside the channel lip, a driving shaft, a clutch for connecting it to its actuating means, connections between the shaft and protecting means to move it toward and from the work support, and operating connections between the protecting means and centering means for moving the latter by the former.

30. In a machine of the character described, the combination of a work support, a protector frame carrying lip protectors, a driving shaft, connections between the driving shaft and protector frame for moving the latter toward the work on the work support, a centering frame or presser, and operating connections between the protector frame and centering frame or presser to cause the latter to be moved to the work by the former.

31. In a machine of the class described, the combination of a work support, protector frames carrying lip protectors, a driving shaft, and connections between the driving shaft and protector frames for moving said frames toward the work support and separating the protector frames, then to raise them from the work support and move them toward each other.

32. In a machine of the character described, the combination of a work support, protector frames carrying lip protectors, a centering frame or presser, and means for moving the protector frames toward the centering frame or presser while said parts are removed from the work support and to separate said protector frames when the lip protectors are in coöperating relation with the sole.

33. In a machine of the character described, the combination of a work support, protector frames carrying lip protectors, a centering frame or presser, and positively acting power means for moving the protector frames toward the centering frame or presser while said parts are removed from the work support and to separate said protector frames when the lip protectors are in coöperating relation with the sole.

34. In a machine of the character described, the combination of a work support, protector frames carrying lip protectors, a centering frame or presser, means for moving the protector frames toward the centering frame or presser, means for operatively engaging said frames when so relatively moved, and means for moving the protector frames, and through them the centering frame or presser, toward the work support.

35. In a machine of the character described, the combination of a work support to sustain a shoe sole, a centering frame or presser having a flexible face, a slide for swinging said flexible face laterally, a rack for locking the slide, a catch 157 for engaging the rack, and a handle 153 having lugs 163 for disengaging the catch 157 from the rack as the handle is swung.

36. In a machine for protecting the channel lip of an insole during the application of a reinforcing fabric, the combination of a work support for sustaining a shoe sole, lip protecting means to shield the lip as the reinforcing fabric is applied to the sole, and means permitting the lip protecting means to yield in a direction toward and from the work support as demanded by varying thickness of work.

37. In a machine of the character described, the combination of a work support for sustaining a shoe sole, lip protecting means to shield the channel lip as a reinforcing fabric is applied to the sole, means for causing relative approach and separation of the work support and lip protecting means, and means to permit the lip protecting means to yield in a direction substantially normal to the general plane of the work support as required by varying thickness of the sole.

38. In a machine of the character described, the combination of a work support for sustaining a shoe sole, channel lip protecting means to shield the lip as reinforcing fabric is applied to the sole, a driving shaft, connections between the driving shaft and lip protecting means for moving the latter toward the work on the work support, a centering frame or presser, and means for causing the lip protecting means to move the centering frame or presser toward the work as said protecting means is itself moved by the driving shaft.

39. In a machine of the character described, the combination of a work support for sustaining a shoe sole, channel lip protecting means to shield the lip as reinforcing fabric is applied to the sole, a driving shaft for moving the protecting means toward the work on the work support, a centering frame or presser, and coöperating engaging portions on said protecting means and centering frame or presser for causing the former to move the latter toward the sole on the work support.

40. In a machine for protecting the channel lip of an insole during the application of reinforcing material, the combination of a work support for sustaining the sole, means disposed to act at opposite edges of the sole to shield the channel lip as the reinforcing material is being applied to the sole, and unitary means for causing relative approach and separation of the work support and lip protecting means.

41. In a machine for protecting the channel lip of an insole during the application of reinforcing material, the combination of a work support for sustaining the sole, means disposed to act at opposite edges of the sole to shield the channel lip as the reinforcing material is being applied to the sole, and unitary means for causing relative approach and separation of the work support and lip protecting means and for relatively moving the lip protecting means transversely of the sole toward and from each other.

42. In a machine of the character described, the combination of a work support for sustaining an insole, channel lip protecting means to shield the lip during the application of reinforcing material to the insole, and unitary power operated means for causing relative approach and separation of the work support and lip protecting means.

43. In a machine of the character described, the combination of a work support for sustaining an insole, channel lip protecting means to shield the lip during the application of reinforcing material to the insole, and unitary power operated means for causing relative approach and separation of the work support and lip protecting means and for moving the lip protecting means transversely of the insole.

44. In a machine of the character described, the combination of a work support, channel lip protecting means to shield the lip during the application of reinforcing material to the sole, a driving shaft, and means for causing the driving shaft to move the protecting means and work support into coacting close relation and then to separate the work support and lip protecting means.

45. In a machine of the character described, the combination of a work support for sustaining an insole, channel lip protecting means to engage inside the channel lip and shield it during the application of reinforcing material to the insole, a driving shaft, connections between the driving shaft and lip protecting means, and means for causing the driving shaft to bring the lip protecting means and insole into contact and then stop and to thereafter separate said protecting means and insole.

46. In a machine for protecting the channel lip of an insole during the application of reinforcing material to the sole, the combination of a work support for sustaining an insole, lip protecting means disposed relatively at opposite sides of the work support, means for relatively moving the work support and lip protecting means to bring the latter into contact with the sole on said support, and means for positively separating the lip protecting means transversely of the sole.

47. In a machine for protecting the channel lip of an insole during the application of reinforcing material to the sole, the combination of a work support for sustaining an insole, lip protecting means disposed relatively at opposite sides of the work support, means for relatively moving the work support and lip protecting means to bring the latter into contact with the sole on said support, and means for positively moving the lip protecting means at opposite sides of said support toward and from each other.

48. In a machine of the character described, the combination of a work support for sustaining an insole, channel lip protecting means for shielding the lip during the application of reinforcing fabric to the insole, a centering or presser frame, and devices to cause said frame to move into contact with the insole with the lip protecting means and to free the centering or presser frame from said devices by separation of the lip protecting means.

49. In a machine of the character described, the combination of a work support for sustaining an insole, channel lip protecting means disposed at opposite sides of the work support for shielding the lip during the application of reinforcing fabric to the insole, a centering or presser frame, and devices to cause said frame to move into contact with the insole with the lip protecting means and to free the centering or presser frame from said devices by separation of the lip protecting means.

50. In a machine of the character described, the combination of a supporting frame, channel lip protecting means sustained thereby to shield the channel lip during the application of reinforcing material to the insole, a driving shaft, connections between the driving shaft and protecting means for positively raising and lowering the same, and means actuated from the driving shaft for positively moving the protecting means transversely.

51. In a machine of the character described, the combination of a supporting frame, channel lip protecting means disposed at each side thereof, means for positively raising and lowering said protecting means, and means for positively separating and contracting said protecting means relatively.

52. In a machine of the character described, the combination of a supporting frame, channel lip protecting means disposed at each side of the frame, a driving shaft, a cam actuated by the driving shaft for positively raising and lowering said means, and a cam actuated by the driving shaft for positively moving said lip protecting means at each side of the frame toward and from each other.

53. In a machine of the character described, the combination of a work support for sustaining an insole, channel lip protecting means disposed to act at each edge of an insole on said support, means for raising and lowering said lip protecting means, and means for moving them toward each other when in raised position and for positively separating them when in lowered position.

54. In a machine of the character described, the combination of a work support for sustaining a shoe sole, channel lip protecting means disposed to act at the edge portions of a sole on said support to shield the lip during the application of reinforcing material, a shaft, treadle controlled means for causing said shaft to be turned, and means operated from said shaft for causing relative approach of the protecting means and work support and for separating the protecting means during one cycle of its movement and for raising and contracting the protecting means during another cycle of its movement.

55. In a machine of the character described, the combination of a work support for sustaining a shoe sole, channel lip protecting means disposed to act at the edge portions of a sole on said support to shield the lip during the application of reinforcing material, a shaft, treadle controlled means for causing said shaft to be turned and then come to rest, and means operated from said shaft for causing relative approach of the protecting means and work support and for separating the protecting means during one cycle of its movement and for raising and contracting the protecting means during another cycle of its movement.

In testimony whereof, I have signed my name to this specification, in the presence of two subscribing witnesses.

WILLIAM C. STEWART.

Witnesses:
 EDWIN W. PETRIE,
 HARRY T. MCCLURE.